United States Patent [19]

Ladany

[11] 4,237,474
[45] Dec. 2, 1980

[54] ELECTROLUMINESCENT DIODE AND OPTICAL FIBER ASSEMBLY

[75] Inventor: Ivan Ladany, Stockton, N.J.

[73] Assignee: RCA Corporation, New York, N.Y.

[21] Appl. No.: 952,350

[22] Filed: Oct. 18, 1978

[51] Int. Cl.³ .................. H01L 33/00; H01L 23/02; H01L 23/12
[52] U.S. Cl. .................................. 357/81; 357/17; 357/74; 350/96.20
[58] Field of Search .................. 357/17, 18, 19, 28, 357/81, 74; 350/96.20

[56] References Cited

U.S. PATENT DOCUMENTS

| | | | |
|---|---|---|---|
| 3,508,100 | 4/1970 | Tillays et al. | 357/17 |
| 3,872,418 | 3/1975 | Plough et al. | 357/28 |
| 3,996,526 | 12/1976 | Dauria et al. | 350/96.20 |
| 4,003,074 | 1/1977 | Yonezu et al. | 357/81 |
| 4,119,363 | 10/1978 | Camlibel | 357/17 |
| 4,152,713 | 5/1979 | Copeland et al. | 357/17 |
| 4,167,744 | 9/1979 | Nyul | 357/17 |

*Primary Examiner*—Andrew J. James
*Attorney, Agent, or Firm*—Harold Christoffersen; Donald S. Cohen

[57] ABSTRACT

An optical fiber and an electroluminescent semiconductor diode are each secured to separate mounting blocks which in turn are secured to each other, either directly or through an additional block, with the optical fiber aligned with the output of the diode. The mounting blocks are secured together by a thin layer of a bonding material which is preferably fast setting so as to prevent or limit relative movement between the mounting blocks which could cause misalignment of the optical fiber and the diode. The bonding material is preferably of the type which is cured when subjected to ultraviolet light, and at least one of the mounting blocks is preferably transparent to the ultraviolet light.

9 Claims, 4 Drawing Figures

ELECTROLUMINESCENT DIODE AND OPTICAL FIBER ASSEMBLY

The present invention relates to an assembly of an electroluminescent semiconductor diode and an optical fiber, and particularly to such an assembly which provides for accurate alignment of an end of the optical fiber with the light emitting surface of the diode.

BACKGROUND OF THE INVENTION

In optical communication systems which include a light source, a light detector and an optical fiber connected between the light source and the detector, electroluminescent semiconductor diodes, such as laser diodes and light emitting diodes, have come into use as the light source. To provide for ease of connecting the optical fiber to the electroluminescent diode so that the light from the diode enters the optical fiber, the electroluminescent semiconductor device assembly is provided with a short length of an optical fiber having one end adjacent to and aligned with the surface of the electroluminescent diode from which the light is emitted. The short length of optical fiber extends through and projects from the housing encasing the electroluminescent semiconductor diode so that the main optical fiber can be connected to the short length of optical fiber.

In the electroluminescent semiconductor diode assembly, the diode and the short length of optical fiber are each mounted on separate mounting blocks. After the end of the optical fiber is aligned with the light emitting surface of the diode by moving the two mounting blocks relative to each other, the mounting blocks are secured together with a suitable cement, generally a resin cement which is then cured to fixedly secure the optical fiber in alignment with the diode. I have found that there often occurs some misalignment between the optical fiber and diode which results from shifting of the bonding cement during its curing. Therefore, it would be desirable to have an assembly in which the position of the optical fiber can be easily adjusted to achieve proper alignment with the diode but which would eliminate or at least minimize any shifting during the curing of the cement.

SUMMARY OF THE INVENTION

An electroluminescent semiconductor diode assembly includes an electroluminescent semiconductor diode mounted on a mounting block, and an optical fiber mounted on a securing block with an end of the optical fiber being adjacent to and aligned with a light emitting end surface of the diode. The two mounting blocks are secured together through at least one thin layer of a cement. The cement layer is thin enough to minimize relative movement between the mounting blocks when the cement is cured but thick enough to permit ease of movement between the mounting blocks prior to curing the cement.

DETAILED DESCRIPTION OF THE INVENTION

Figure 1:
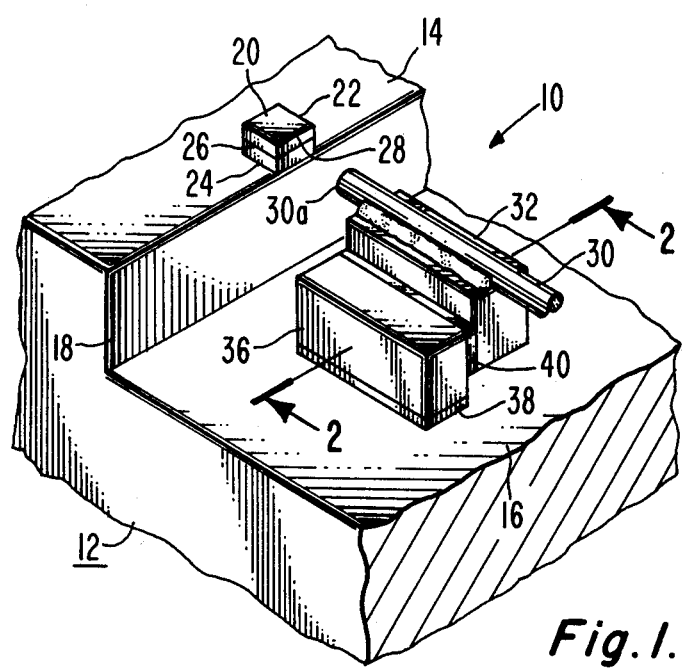
FIG. 1 is a perspective view of a portion of one form of the electroluminescent semiconductor diode assembly incorporating the present invention.
Figure 2:
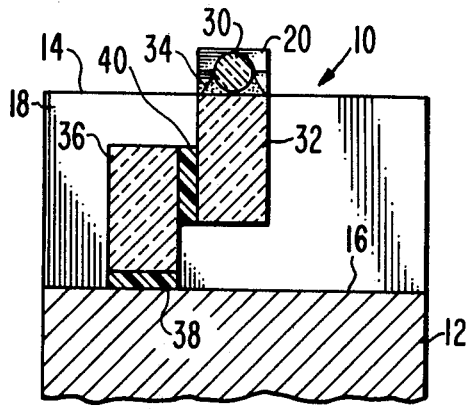
FIG. 2 is a sectional view taken along line 2—2 of FIG. 1.

Referring to FIG. 1, one form of an electroluminescent semiconductor diode and optical fiber assembly incorporating the present invention is generally designated as 10. The assembly 10 includes a mounting block 12 having a pair of spaced, substantially parallel surfaces 14 and 16 which face in the same direction and a wall 18 extending between the surfaces 14 and 16. The mounting block 12 is of a material which is a good conductor of heat and may be of either an electrically conductive material, such as copper, or an insulating material such as alumina or beryllia. An electroluminescent semiconductor diode 20 is mounted on the surface 14 of the mounting block 12 adjacent the wall 18. The electroluminescent semiconductor diode 20 in general is a body of a semiconductor material, such as a Group III-V compound or alloys of such compounds, having regions 22 and 24 of opposite conductivity types forming a PN junction 26 therebetween. The PN junction 26 extends to at least one surface 28 from which light is emitted from the device. The electroluminescent semiconductor diode 20 may be either a laser diode or a light emitting diode of any well known specific construction, such as that described in U.S. Pat. No. 3,974,514 to H. Kressel et al., issued Aug. 10, 1976.

The electroluminescent semiconductor diode 20 is mounted on the surface 14 with the light emitting surface 28 of the diode 20 extending along and facing in the same direction as the wall 18 of the mounting block 12. If the mounting block 12 is of an electrically conductive metal, the electroluminescent semiconductor diode 20 may be secured to the surface 14 by an electrically conductive cement or solder so that the region 24 of the electroluminescent semiconductor diode 20 is electrically connected to the mounting block 12. A terminal wire, not shown, is secured to the region 22 of the electroluminescent semiconductor diode 20 to act as a second terminal of the diode. If the mounting block 12 is of an electrical insulating material, the surface 14 may be coated with a layer of an electrically conductive metal to which the electroluminescent semiconductor diode 20 is secured.

A short length of an optical fiber 30 extends along and is secured to a mounting block 32 by a suitable cement 34. The optical fiber 30 is mounted on the mounting block 32 with one end 30A projecting slightly beyond one end of the mounting block 32. An intermediate block 36 is seated on the surface 16 of the mounting block 12 and is secured thereto by a thin layer 38 of a cement as will be described. The optical fiber mounting block 32 is positioned along the intermediate block 36 with the end 30A of the optical fiber 30 being adjacent to and aligned with the light emitting surface 28 of the electroluminescent semiconductor diode 20. The optical fiber mounting block 32 is secured to the intermediate block 36 by a thin layer 40 of a cement.

To make the assembly 10, an electroluminescent semiconductor diode 20 is mounted on and secured to the surface 14 of the mounting block 12, and a short length of optical fiber 30 is placed on and secured to a mounting block 32 with a suitable cement. The mounting block 32 and the intermediate block 36 are placed in side-by-side relation on the surface 16 of the mounting block 12 with a thin layer of uncured cement being between the intermediate mounting block 36 and the surface 16 and between the mounting block 32 and the intermediate block 36. The mounting block 32 and the intermediate block 36 are then moved about until the end 30A of the optical fiber 30 is in direct alignment with the light emitting surface 28 of the electroluminescent semiconductor diode 20. This can be determined by applying a voltage across the electroluminescent semiconductor diode 20 to cause light to be emitted therefrom and by connecting the free end of the optical fiber 30 to a light detector. When the light detector indicates a maximum amount of light, the end 30A of the optical fiber 30 is properly aligned with the electroluminescent semiconductor diode 20. The mounting block 32 and intermediate block 36 can be moved about either manually or by suitable mechanical means, such as a micromanipulator. When the optical fiber 30 is properly aligned with respect to the electroluminescent semiconductor diode 20, the mounting block 32 and intermediate block 36 are held in that position until the cement layers 38 and 40 are cured to fixedly secure the optical fiber 30 to its proper position.

I have found that by making the cement layers 38 and 40 very thin, no greater than about 0.625 mm, there is little or no movement of the cement layers when they cure so that misalignment of the optical fiber 30 with respect to the electroluminescent semiconductor diode 20 is eliminated or minimized. However, the cement layers 38 and 40 must be of sufficient thickness to provide an acceptable bond strength between the parts being held together, and to provide sufficient fluid between the parts to permit movement of the mounting block 32 and intermediate block 36 for aligning the optical fiber 30. I have found that a minimum thickness of about 0.125 mm of the cement is necessary for this purpose. However, a preferred thickness of the cement layers is about 0.25 mm. Also, the cement layers must be of a material having a low enough viscosity to permit the cement material to be spread out in the thin layers required. I have found that resin cements having a viscosity of 600 to 3000 CP are suitable for this purpose. In addition, it is desirable to have a cement which is fast curing so as to minimize the time of carrying out the whole process. However, the cement must remain fluid long enough to allow the blocks to be moved about for aligning the optical fiber with the electroluminescent semiconductor diode. I have found that resin cements which are cured by being subjected to ultraviolet light are highly suitable for this purpose. These cements are fluid to permit movement of the blocks and when the proper alignment is achieved the cements can be quickly cured by subjecting them to the ultraviolet light. When such a cement is used, at least the intermediate block 36 and preferably also the mounting block 32 should be of a material which is transparent to the ultraviolet light, such as glass. The epoxy cements, such as Tra-bond 2129 made by Tra-Con Inc. of Medford, Massachusetts or Torr-seal made by Varian Associates of Palo Alto, California, are suitable for self-curing cements. Cements of the acrylic ester type, such as Loctite 353-18 made by Loctite Corp. of Norrington, Connecticut, are suitable for the ultraviolet curing cements.

Figure 3:
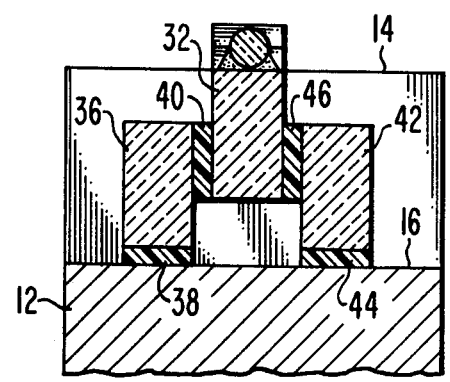
FIG. 3 is a sectional view similar to FIG. 2 showing another form of the assembly.

Although the assembly 10 is shown with an intermediate block 36 between the mounting block 32 and the surface 16 of the mounting block 14, if the optical fiber mounting block 32 is of the proper height, it can be mounted directly on the surface 16 with the thin cement layer being between the mounting block 32 and the surface 16. However, when using an intermediate block 36 between the optical fiber mounting block 32 and the surface 16, chances of misalignment can be further minimized by using a second intermediate block 42 on the side of the optical fiber mounting block 32 opposite that where the first intermediate block 36 is mounted, as shown in FIG. 3. A thin layer 44 of cement is provided between the second intermediate block 42 and the surface 16 of the mounting block 12, and a thin layer of cement 46 is provided between the secured intermediate block 42 and the optical fiber mounting block 32. By having the optical fiber mounting block 32 sandwiched between the two intermediate blocks 36 and 42, any movement of the cement layers 40 and 46 during curing will compensate each other to prevent movement of the optical fiber mounting block 32. If the cements used are of the ultraviolet curing type, the second intermediate block 42 should also be of a material which is transparent to the ultraviolet light.

Figure 4:
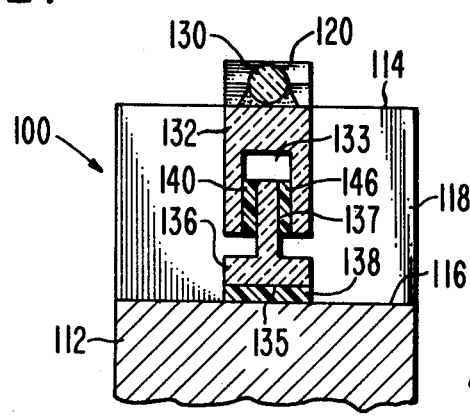
FIG. 4 is a sectional view similar to FIG. 2 showing still another form of the assembly.

Referring to FIG. 4, another form of the assembly incorporating the present invention is generally designated as 100. The assembly 100 includes a substrate 112 having a pair of spaced surfaces 114 and 116 facing in the same direction and a wall 118 extending between the surfaces 114 and 116. An electroluminescent semiconductor diode 120 of the same construction as the electroluminescent semiconductor diode 20 shown in FIG. 1, is mounted on the surface 14 at the wall 118. A short length of an optical fiber 130 is mounted on a mounting block 132. The mounting block 132 has a recess 133 in its surface opposite the surface on which the optical fiber 130 is mounted. A T-shaped intermediate block 136 has its head 135 mounted on and secured to the surface 116 by a thin layer of a cement 138. The leg 137 of the intermediate block 136 projects away from the surface 116 and extends into the recess 133 in the optical fiber mounting block 132. The optical fiber mounting block 132 is secured to the intermediate block 136 by thin layers 140 and 146 of a cement which is between the side walls of the recess 133 and the sides of the leg 132.

The cement layers 138, 140 and 146 are thin as previously described, so that when they are cured there is little, if any, movement of the cement layers which will cause misalignment of the optical fiber 130 with respect to the electroluminescent semiconductor diode 120. By having cement layers 140 and 146 on opposite sides of the leg 137 of the intermediate block 136, the layer on one side will compensate for any movement of the layer on the other side to further minimize movement of the optical fiber 130. If the cement layers are of a material which is cured when subjected to ultraviolet radiation, the optical fiber mounting block 132 and the intermediate block 136 should be made of a material which is transparent to the ultraviolet radiation.

Thus, there is provided an electroluminescent semiconductor diode and optical fiber assembly which provides for ease of aligning the optical fiber with the light emitting surface of the electroluminescent semiconductor diode. By using thin layers of cement to bond the mounting blocks together there is little, if any, movement of the cement as it cures so that misalignment of the optical fiber with the electroluminescent semiconductor diode is eliminated or minimized. By using a cement which is cured when subjected to ultraviolet radiation, the cement can be cured quickly to achieve good alignment of the optical fiber with the electroluminescent semiconductor diode. If desired, the assembly can be placed in a housing, which can be of a material, glass or ceramic, with the terminals for the electroluminescent semiconductor diode and the free end of the optical fiber extending through the housing.

I claim:

1. In an electroluminescent semiconductor diode assembly which includes an electroluminescent semiconductor diode mounted on a mounting block, an optical fiber mounted on a separate mounting block with an end of the optical fiber being adjacent to and aligned with a light emitting end surface of said diode and at least one layer of a cement securing the optical fiber mounting block to the diode mounting block, the improvement comprising:

said cement layer being thin enough to minimize movement of the mounting blocks relative to each other upon curing of the cement but thick enough to allow ease of moving the blocks relative to each other prior to curing of the cement.

2. An assembly in accordance with claim 1 in which said cement layer is of a thickness of between 0.125 and 0.625 mm.

3. An assembly in accordance with claim 1 in which the cement layer is of a thickness of about 0.25 mm.

4. An assembly in accordance with claim 1 including an intermediate block secured between the optical fiber mounting block and the diode mounting block, and a separate thin layer of a cement between the intermediate block and each of the mounting blocks with each of the cement layers being of a thickness of between 0.125 and 0.625 mm.

5. An assembly in accordance with claim 4 in which the cements are of a resin material which is cured when subjected to ultraviolet radiation and at least the intermediate block is of a material which is transparent to ultraviolet radiation.

6. An assembly in accordance with claim 5 in which the intermediate block and the optical fiber mounting block are both of a material which is transparent to ultraviolet radiation.

7. An assembly in accordance with claim 4 including a pair of intermediate blocks, one on each side of the optical mounting block, each of said intermediate blocks being secured to the diode mounting block by a separate thin layer of a cement and said optical fiber mounting block being secured to each of said intermediate blocks by separate thin layers of a cement, each of said cement layers being of a thickness of between 0.125 and 0.625 mm.

8. An assembly in accordance with claim 4 in which the optical fiber mounting block has a recess in its surface opposite to that surface on which the optical fiber is mounted, the intermediate block is T-shaped with the head being seated on the diode mounting block and the leg extending onto the recess in the optical fiber mounting block, the intermediate block is secured to the diode mounting block by a thin layer of a cement and to the optical fiber mounting block by separate thin layers of cement between the sides of the recess and the sides of the leg, each of said cement layers is of a thickness of between 0.125 and 0.625 mm.

9. An assembly in accordance with claim 4 in which the diode mounting block includes a pair of spaced surfaces facing in the same direction and a wall extending between said surfaces, the diode is mounted on one of said surfaces and the optical fiber mounting block and the intermediate block are on the other of said surfaces.

* * * * *